(12) United States Patent
Kommera et al.

(10) Patent No.: US 7,470,581 B2
(45) Date of Patent: Dec. 30, 2008

(54) ELECTROMAGNETIC WAVEGUIDE

(75) Inventors: Swaroop K. Kommera, Corvallis, OR (US); Tim R. Koch, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/494,429

(22) Filed: Jul. 27, 2006

(65) Prior Publication Data

US 2008/0026495 A1    Jan. 31, 2008

(51) Int. Cl.
    *H01L 21/20* (2006.01)
(52) U.S. Cl. ............... 438/199; 438/493; 257/E23.025; 257/E23.033; 257/E27.151
(58) Field of Classification Search ............. 106/31.33; 438/21, 199, 493; 257/E21.255, 678, 672, 257/677, 98, E23.025, E23.033, E27.151; 385/122
    See application file for complete search history.

(56) References Cited

U.S. PATENT DOCUMENTS

| | | | |
|---|---|---|---|
| 4,680,204 A | 7/1987 | Das et al. | |
| 5,312,484 A | 5/1994 | Kaliski | |
| 5,481,633 A * | 1/1996 | Mayer | ......................... 385/49 |
| 5,623,571 A * | 4/1997 | Chou et al. | .................. 385/130 |
| 6,471,761 B2 | 10/2002 | Fan et al. | |
| 6,702,894 B2 | 3/2004 | Lee et al. | |
| 6,747,123 B2 * | 6/2004 | Chen et al. | ................... 528/480 |
| 6,987,603 B2 * | 1/2006 | Paolini et al. | ............... 359/296 |
| 7,019,391 B2 * | 3/2006 | Tran | ........................... 257/678 |
| 7,283,707 B1 * | 10/2007 | Maleki et al. | .................. 385/39 |
| 2004/0071965 A1 | 4/2004 | Fu et al. | |
| 2006/0203328 A1 * | 9/2006 | Lazarev et al. | .............. 359/321 |
| 2006/0244781 A1 * | 11/2006 | Kommera et al. | ............. 347/40 |
| 2006/0286737 A1 * | 12/2006 | Levy et al. | ................... 438/199 |

* cited by examiner

*Primary Examiner*—Michael S Lebentritt

(57) ABSTRACT

A method of manufacturing an electromagnetic (EM) waveguide capable of guiding a wave along a pre-defined propagation path is described. The method includes providing a core region that extends along the propagation path and printing a colloidal crystal comprised of first particles on the waveguide core region.

20 Claims, 14 Drawing Sheets

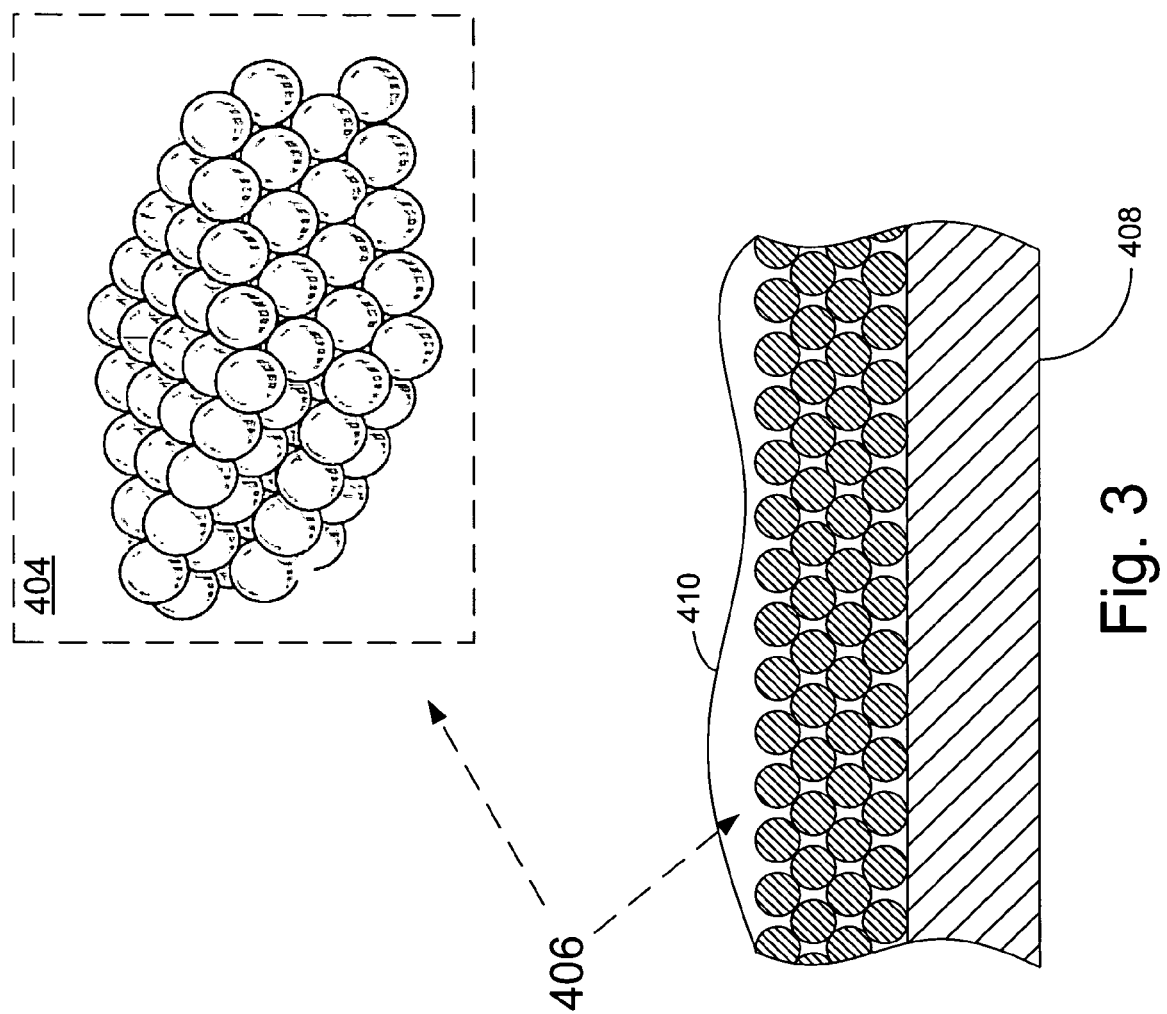

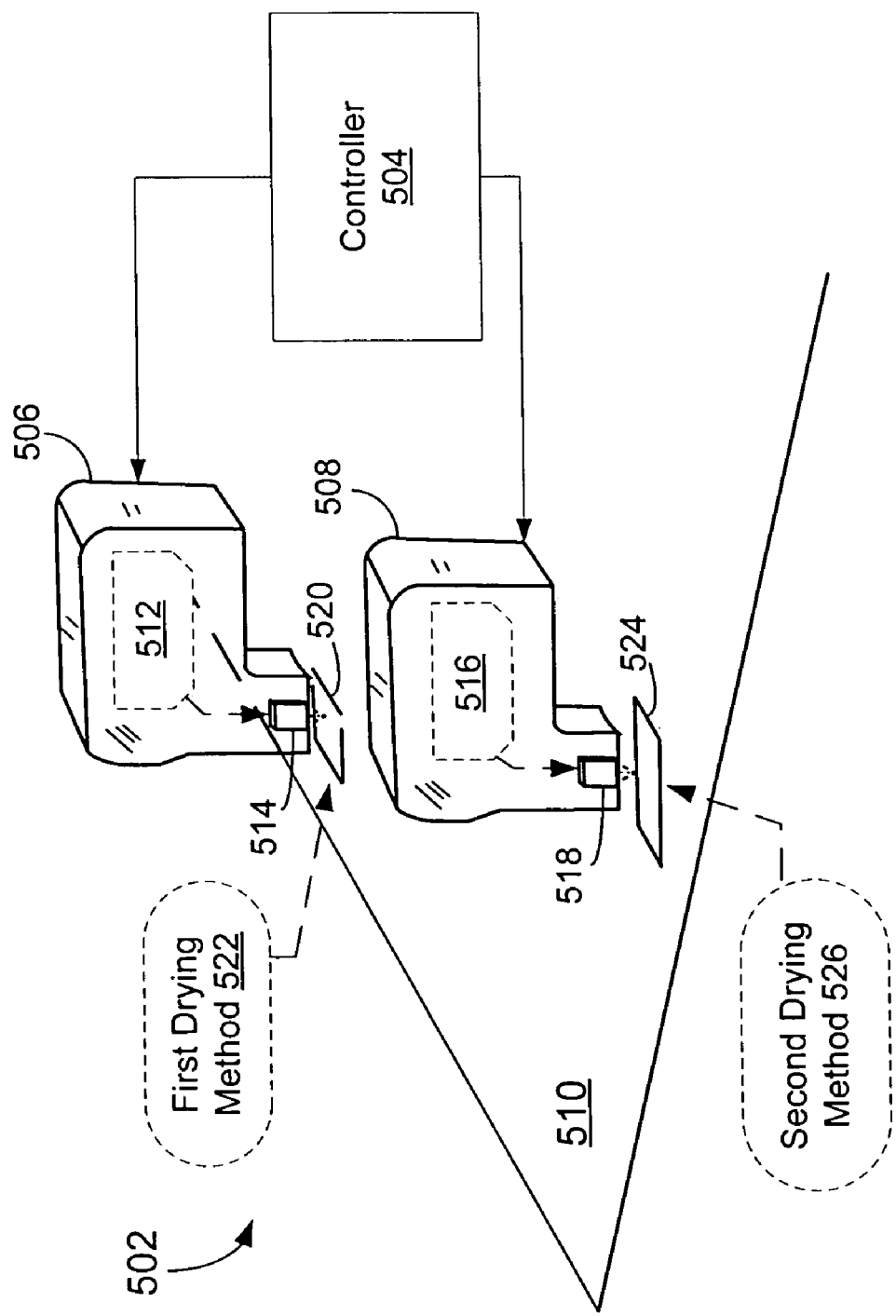

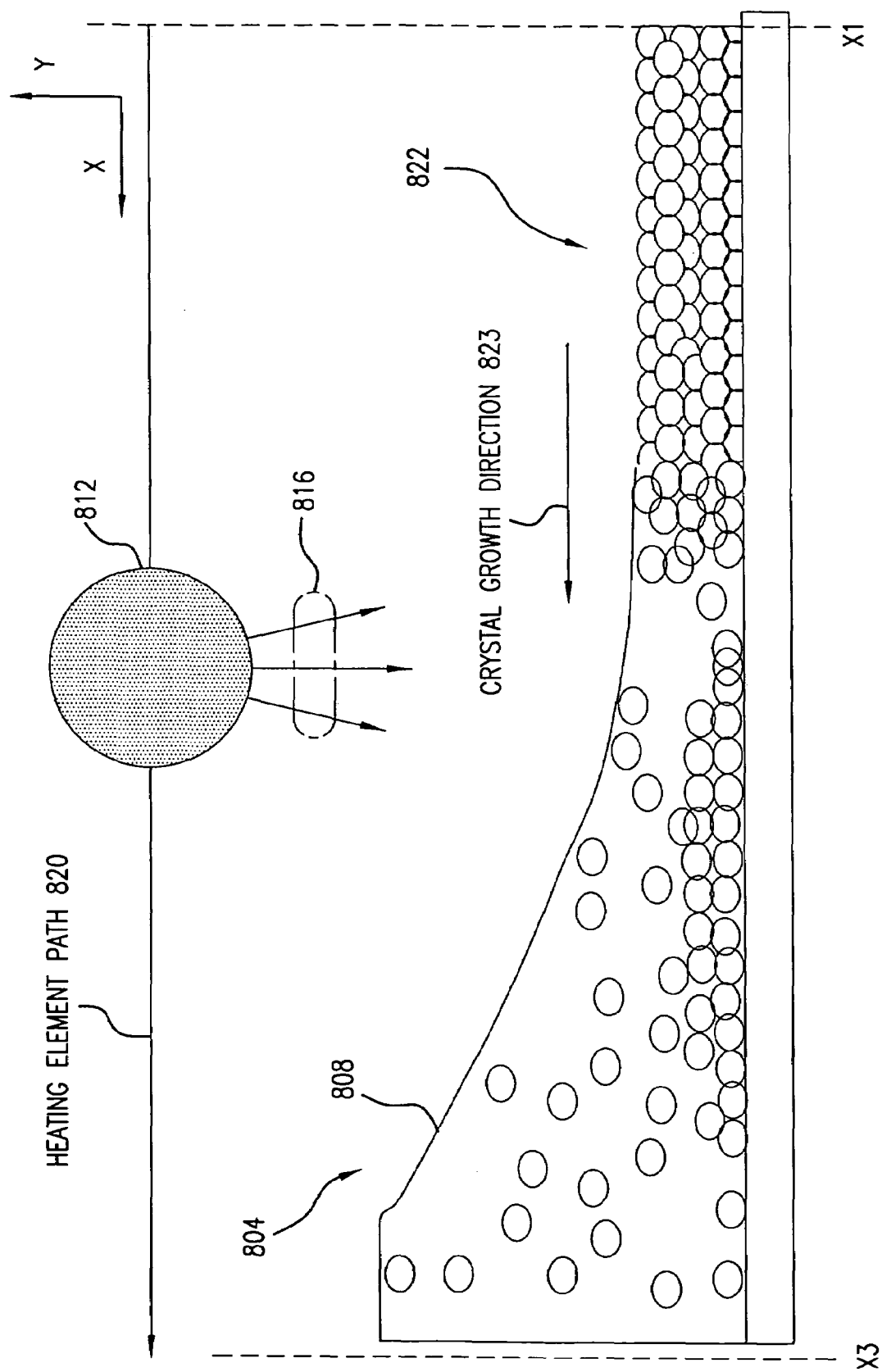

ELECTROMAGNETIC WAVEGUIDE

BACKGROUND

An electromagnetic waveguide (waveguide) is a structure that can guide an electromagnetic (EM) wave to propagate along a defined propagation path. A waveguide structure, such as an optical fiber, may include a core region that corresponds to the waveguide propagation path and a cladding region that surrounds (or partially surrounds) the core region. In operation, the waveguide structure can constrain waves (typically by some condition of internal reflection) of certain frequencies to propagate through the core region along the waveguide propagation path.

Unfortunately, prior art methods of fabricating waveguides that are suitable for use in certain applications are often impracticable, inflexible, or not cost effective. It is therefore worthwhile to address these limitations.

BRIEF DESCRIPTION OF THE DRAWINGS

FIG. 3 is a cross-sectional view of a colloidal crystal structure that may be printed;

FIG. 4 is a diagram of a printer that is in accordance with an embodiment of the invention;

FIG. 6B illustrates the operation of the drop drying system;

DESCRIPTION

It should be noted that the drawings are not necessarily true to scale. Further, various elements have not been drawn to scale. Certain dimensions have been exaggerated in relation to other dimensions in order to provide a clearer illustration and understanding of embodiments of the present invention. In particular, vertical and horizontal scales may differ and may vary from one drawing to another.

As used herein, the phrase "photonic bandgap" refers to a frequency range within which the propagation of electromagnetic waves through a structure is substantially prevented (see J. D. Joannopoulos, R. D. Meade, and J. N. Winn, Photonic Crystals, Princeton University Press, Princeton, N.J., 1995).

The phrase "Colloidal crystallization" refers to the phenomenon of colloidal particle self-assembly into a spatially periodic structure. Such a structure may be referred to herein as a "colloidal crystal structure" and may exhibit a photonic bandgap property.

Colloidal Crystal Structure Printer Construction

By way of introduction, it is first noted that conventional inkjet printing refers generally to a technology that places small drops of ink at selected locations on a print medium. A conventional drop-on-demand inkjet printing system typically includes a printhead, an ink supply which supplies liquid ink to the printhead, and an electronic controller which controls the printhead. The printhead includes one or more print elements each including a nozzle and a mechanism that uses a mechanical, thermal or an electrostatic means to eject ink out through the nozzle and toward a print medium, such as a sheet of paper. Typically, the nozzles are arranged in one or more arrays such that properly sequenced ejection of ink from the nozzles causes characters or other images to be printed upon the print medium.

Figure 1:
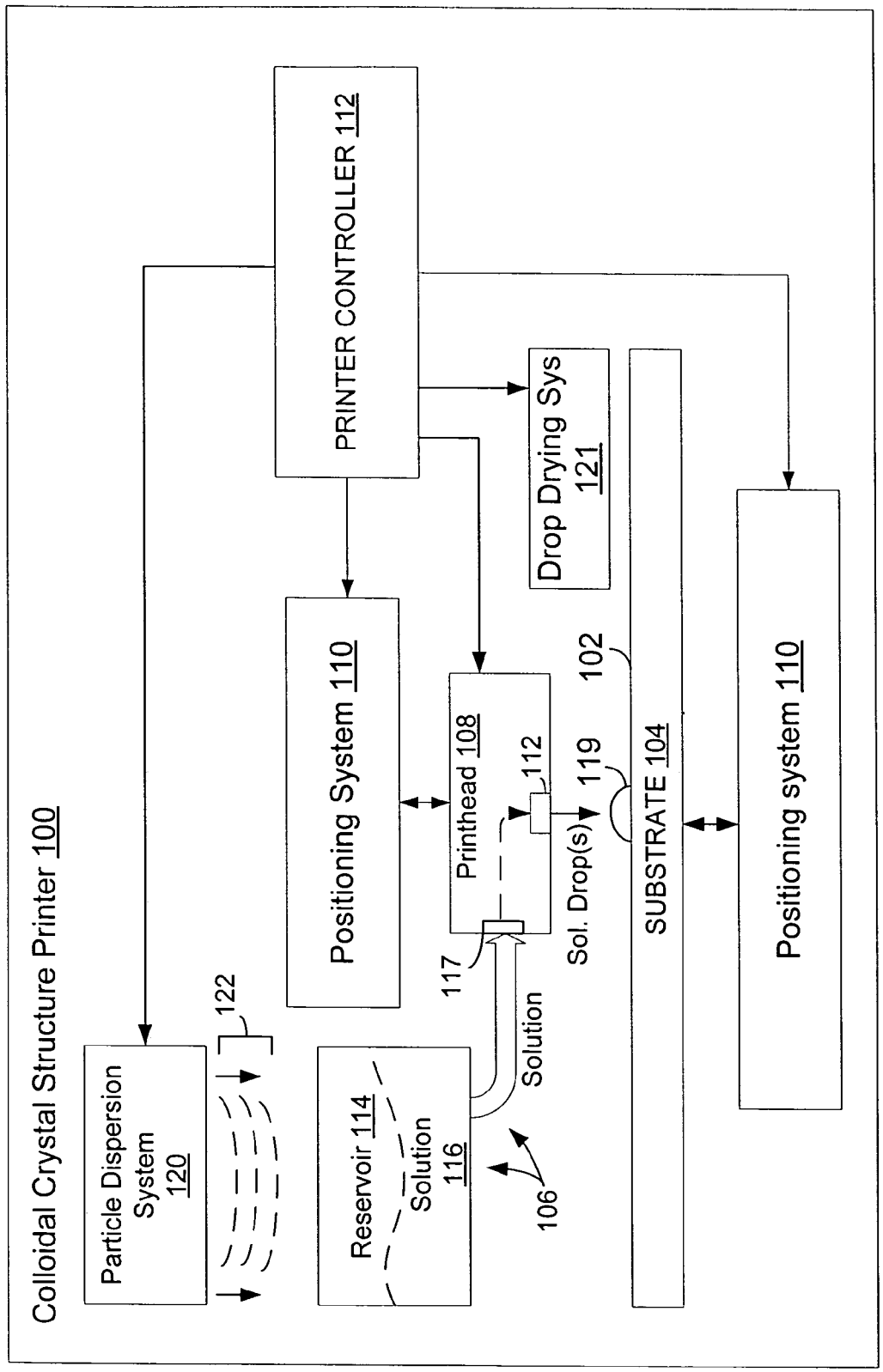
FIG. 1 is a block diagram illustrating one embodiment of a colloidal crystal structure printing system.

FIG. 1 is a block diagram of a "colloidal crystal structure" printer 100 that is in accordance with one example embodiment of the invention. The printer 100 is capable of printing colloidal crystal structures on a surface 102 of a substrate 104. Such colloidal crystal structures are useful in waveguide applications as described further below.

The printer 100 in this example includes a solution supply system 106, a printhead 108, a printhead-to-substrate positioning system 110 and a controller 112. The solution supply system 106 includes a reservoir 114 for holding a supply of a solution 116 and further includes a mechanism for supplying the solution 116 from the reservoir to an inlet 117 of the printhead 108. As such, the solution 116 can flow from the reservoir 114 to the printhead 108. In some implementations, the printhead 108 and the solution supply system 106 are housed together to form a cartridge or pen. In other implementations, the solution supply system 106 is separate from the printhead 108 and supplies the solution 116 through an interface connection, such as a supply tube for example. The reservoir 114 that holds the solution 116 may be refillable and/or field replaceable in some embodiments.

The solution 116 may generally be any type of solution that can be used to grow a colloidal crystal on the substrate surface 102 and that can be ejected by the printhead 108 (as is described below). In the present embodiment, for example, the solution 116 includes substantially monodisperse particles (that are capable of self-assembly) mixed in a solvent. In some implementations, the solution particles may be hydrophilic. In other implementations, for example, the solution particles may be hydrophobic.

For hydrophilic particles the solvent may be water (e.g., De-ionized water) or a type of alcohol (e.g., ethanol, methanol or, propanol), for example, or mixtures thereof. For hydrophobic particles the solvent may be aromatic or aliphatic hydrocarbons or halogenated hydrocarbons (e.g., hexane, toluene, dichloromethane), or mixtures thereof.

Generally, the solution particles may be any suitable shape and size that permits colloidal crystallization and that result in a colloidal crystal of the desired properties. For example, the particles may be of uniform size and of uniform shape, such as oval shaped or sphere shaped. In other implementations, the particles may comprise spheres of different diameters that can self-assemble into a colloidal crystal structure.

In the discussion that follows, however, we will assume that the particles in the solution 116 are substantially uniform diameter spheres. The diameter of the spheres may be nanometer in scale (e.g., at or below 1000 nanometers), for example.

The volume fraction of the spheres in the solution 116 may be selected from a range of 1% to 10%, for example.

The spheres in the solution 116 may generally be formed from any desired material (or set of materials) that can be used to form a sphere. In various implementations, the spheres may be formed from silica, metal (e.g., Titanium Dioxide) or a polymeric material (e.g., polystyrene), for example. In some implementations, the spheres are homogenous. In other implementations, however, the spheres may not be homogenous. For example, the spheres may have a core-shell configuration wherein the cores of the spheres are formed from one material and the shell of the spheres is formed from another material.

In general, the printer 100 can use the printhead 108 and the printhead-to-substrate positioning system 110 to precisely place drops (e.g., drop 119) of the solution 116 at selected locations on the substrate surface 102. The printhead 108 may be a standard inkjet printhead and/or may be designed according to the general principles of a standard inkjet printhead. Accordingly, the printhead 108 includes one or more print elements 112 each including a nozzle and a mechanism that uses a mechanical (e.g., a piezo crystal), electrostatic, or a thermal means (e.g., a thin film resistor) to eject solution 116 out through the nozzle. The positioning system 110 can move the printhead 108 and/or the substrate 104 so as to controllably position the printhead 108 over selected locations of the substrate surface 102.

It is worthwhile to also note that, in the present embodiment, the printer 100 further includes a particle dispersion system 120 and a drop drying system 121. The dispersion system 120 generally enables the printer 100 to maintain and/or increase the uniformity of particle dispersion in the solution 116. In the present embodiment, for example, the dispersion system 120 provides this function by producing ultrasonic waves 122 that tend to vibrate the solution 116 in the reservoir. As the solution 116 vibrates, the uniformity of particle dispersion in the solution can be maintained or increased.

The drop drying system 121 generally enables the printer 100 to apply a pre-determined drying method to the solution drops that are placed on the substrate surface 102. According to one implementation, for example, the drop drying system 121 includes a temperature control system that can raise (or lower) the temperature of drops placed on the substrate surface 102 so as to increase (or decrease) drop evaporation rate. The drop drying system 121 may also include, for example, a mechanism for controlling the air humidity, air pressure and/or (drop local) convective currents. One specific example of a drop drying system is described below with reference to FIGS. 6A and 6B.

The controller 112 generally directs and manages the operation of the printer 100 to print colloidal crystal structures as is described further below. The controller 112 may include one or more processors, firmware, and other printer electronics for communicating with and controlling the various mechanisms in the printer (such as the mechanisms described above). The controller 112 may further include one or more I/O ports that enable the printer 100 to communicate with an external computer, such as an external host computer.

Colloidal Crystal Structure Printer Operation

Figure 2:
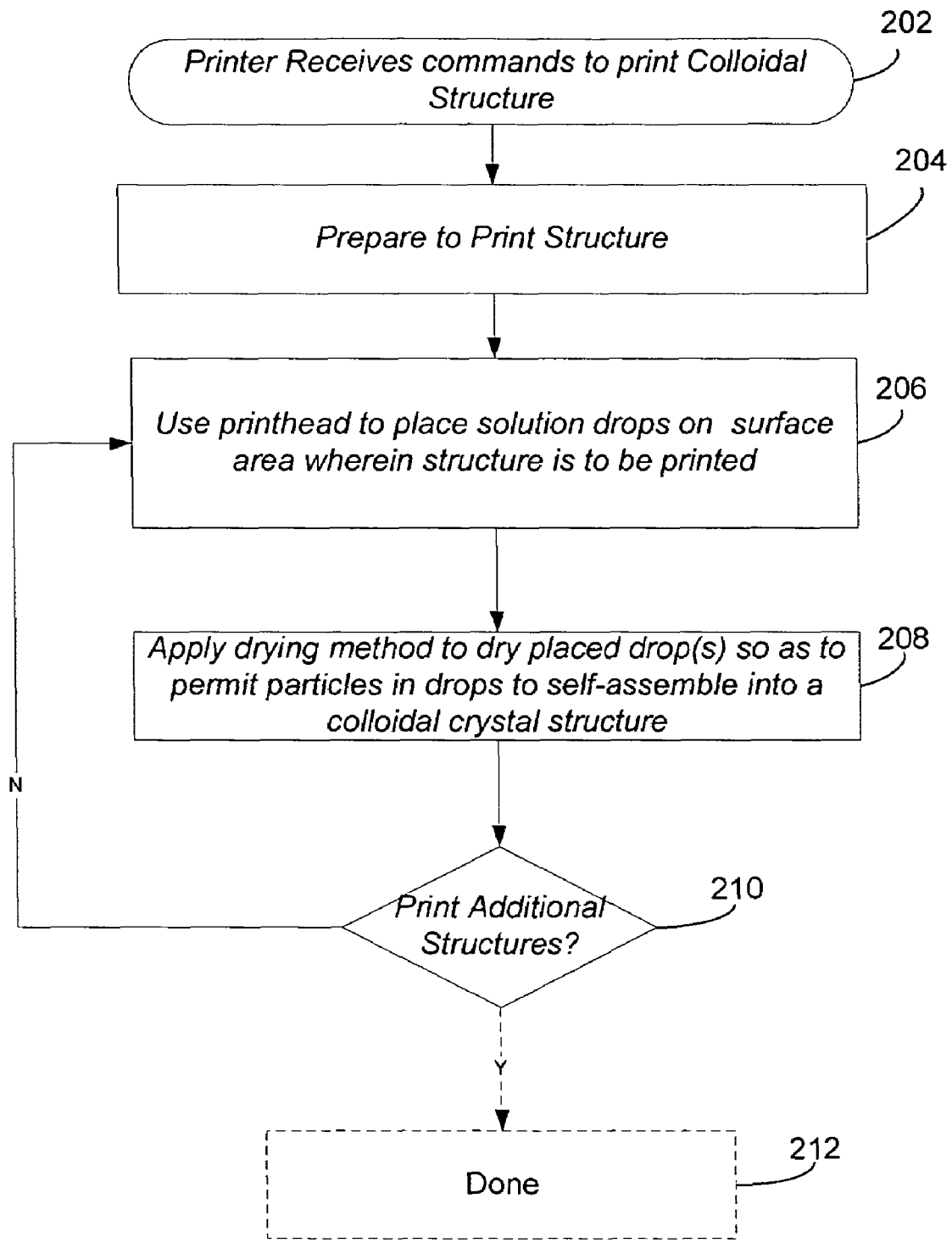
FIG. 2 is a flow diagram that illustrates one example of how the printer may operate to print a colloidal crystal structure.

FIG. 2 is a flow diagram that illustrates one example of how the printer 100 may operate (under the direction of the controller 112) to "print" a desired colloidal crystal structure on a particular area (target area) on a substrate surface 102. As described further below, the "target area" may be a core region of a waveguide structure, for example.

Referring now to FIG. 2, the printer 100 receives a set of commands that direct the printer 100 to print the colloidal crystal structure (step 202). The set of commands may be in the form of a print job, for example, and may be received by the printer 100 from an external host computer. In response to these commands, the printer 100 proceeds to print the colloidal crystal structure as is described below.

At step 204, the printer 100 may perform a "warm-up" process in order to prepare the printer 100 to print the desired colloidal crystal structure. In the present embodiment, for example, step 204 may involve controlling the dispersion system 120 to apply ultrasonic waves to the solution 116 in order to increase the uniformity of particle dispersion in the solution. This may, for example, improve the quality of the colloidal crystal structure that is about to be printed.

At step 206, the printer 100 uses the printhead 108/positioning system 110 to precisely place drops of the solution 116 on the target area of the substrate surface 102 wherein the colloidal crystal structure is to be printed. As is described further below, the target area may be a core region of a waveguide structure, for example. The printer 100 may perform step 206 so as to completely cover the target area with drops of the solution 116.

At step 208, the printer 100 applies a predetermined drying method (using the drop drying system 121) in order to cause the solvent in the placed drops to evaporate in a controlled manner. As the solvent in the drops evaporates, the particles in the drops tend to settle and self-assemble so as to form an "N" layer colloidal crystal structure on the target area. It is noted that the value of "N" may be a function of the volume fraction of the spheres in the solution 116 as well as the drying method used to dry the drops. Accordingly, the value of the "N" may be selected, for example, by varying the solution volume fraction and/or the drying method applied at step 208.

At step 210, the printer 100 may proceed to print additional colloidal crystal structures at other locations on the substrate surface 102 in a similar manner. At step 212, the printing process ends and additional processes may then be applied to the printed colloidal crystal structures.

As is known in the art, a number of different factors may influence the properties of a colloidal crystal that is grown from a solution. Many of these factors have been studied in the prior art literature and include: the material (or materials) used to form the solution particles; the size and shape of the particles; the dielectric constant of the particles; the refractive index of the particles; the particle volume fraction; the ionic strength of the solution; the properties of the substrate surface on which the colloidal crystal is formed, etc.

It is noted that these factors may individually (or in combination) be tailored to control the properties of a colloidal crystal structure that is printed by the printer 100. Accordingly, the printer 100 (e.g., by adjusting one or more of the factors that influence colloidal crystal growth) may be configured to print any number of different types of colloidal crystal structures and these structures can have a wide variety of different properties, such as a desired photonic bandgap property.

FIG. 3 shows a cross-sectional view as well as a perspective view (shown within box 404) of a colloidal crystal structure 406 that may be printed by the printer 100 on a substrate 408 according to one specific implementation. The printed colloidal crystal structure 406 of this example has a desired photonic bandgap property. As such, the colloidal crystal structure 406 may be used as a in a waveguide structure to guide waves that fall within the bandgap frequency.

The printed colloidal crystal structure 406 is shown, in this example, to include uniform diameter spheres (which may be nanoscale in diameter). The spheres are arranged in a close-packed geometry and have a symmetry that corresponds to a face centered crystalline structure (FCC), a hexagonal close packed structure (HCP), or some other randomly stacked polycrystalline structure. In some implementations, the colloidal crystal structure 406 may be stabilized by, for example, applying a suitable coating 410. In some embodiments, the coating 410 may be optically transparent. The crystal structure 406 is shown in the figure to have four layers of spheres. In various embodiments, however, the crystal structure may have more than (or less than) four layers of spheres.

FIG. 4 is somewhat of an abstract diagram that shows components of a printer 502 that is in accordance with an embodiment of the invention. As shown, the printer 502 includes a controller 504, a first pen 506 and a second pen 508. The printer 502 may also include other pens (that are not shown). Additionally, the printer 502 may include a carriage mechanism for selectively moving each of the pens with respect to a substrate surface 510 in accordance with control instructions issued from the controller 504.

Both the first pen 506 and the second pen 508 include a respective reservoir for holding a supply of solution that can be used to grow a colloidal crystal. The pens 506, 508 further include respective printheads 514, 518 configured to eject drops of the solution pursuant to control instructions issued from the controller 504.

For illustration purposes we will assume that the first pen 506 holds a first type of solution (solution 512) that enables the first pen 506 to be used to print a first type (crystal type "A") of colloidal crystal structure. We will also assume that the second pen holds a second type of solution (solution 516) that enables the second pen 508 to be used to print a second type (crystal type "B") of colloidal crystal structure.

FIG. 4, for example, illustrates the printer 502 presently using the first pen 506 to print a type "A" colloidal crystal structure on an area 520 of the substrate surface 510. As indicated in FIG. 4, this printing operation involves the use of the first pen 506 to place (via printhead drop ejection) drops of the solution 512 on the area 520 of the substrate surface 510. The printer 502 then applies a first drying method 522 to these drops in order to cause (or permit) the drops to evaporate. As the drops dry, colloidal crystallization occurs resulting in the type "A" colloidal crystal structure being formed over the substrate surface area 520.

FIG. 4 also illustrates the printer 502 presently using the second pen 508 to print a type "B" colloidal crystal structure on an area 524 of the substrate surface 510. As indicated in FIG. 4, this operation is performed by the second pen 508 placing drops of the solution 516 on the surface area 524. The printer may then apply a second drying method 526 to these drops so as to cause the drops to dry. As the drops dry, colloidal crystallization occurs resulting in the "type B" colloidal crystal structure being formed.

The type "A" colloidal crystal structure may have a first bandgap property (Band gap property "A"). The type "B" colloidal crystal structure may have a second bandgap property (Band gap property "B") that is different that the bandgap property of the type "A" crystal structure. Accordingly, the type "A" colloidal crystal may be used to guide waves of a frequency (frequency "A") that falls within bandgap "A". The type "B" colloidal crystal may be used to guide waves of a frequency (frequency "B") that falls with bandgap "B".

It is noted that in some implementations, the first drop drying method 522 and the second drop method 526 may be different drying methods and may be tailored to account for the differences between the two solutions 512, 516. For example, the first drying method 522 may involve raising drop temperature to a pre-determined temperature that is above room temperature and/or may involve creating a temperature gradient within the drop solution. The second drying method 526 may involve allowing the drop solution to evaporate at room temperature, for example.

It is further noted that in some implementations, the printer 502 may be capable of using more than one pen to print a single colloidal crystal structure. This capability can add further to the types of crystal structures the printer 502 can print. To illustrate this feature, we will assume in the next part of this discussion that the first pen solution 512 and the second pen solution 516 each are monodisperse (or substantially monodisperse) colloids that include substantially uniform diameter spheres (of nanoscale size) mixed in a solvent. The diameter ("D1") of the spheres in the first pen solution 512 is larger, however, than the diameter ("D2") of the spheres in the second pen solution 516.

Figure 5A:
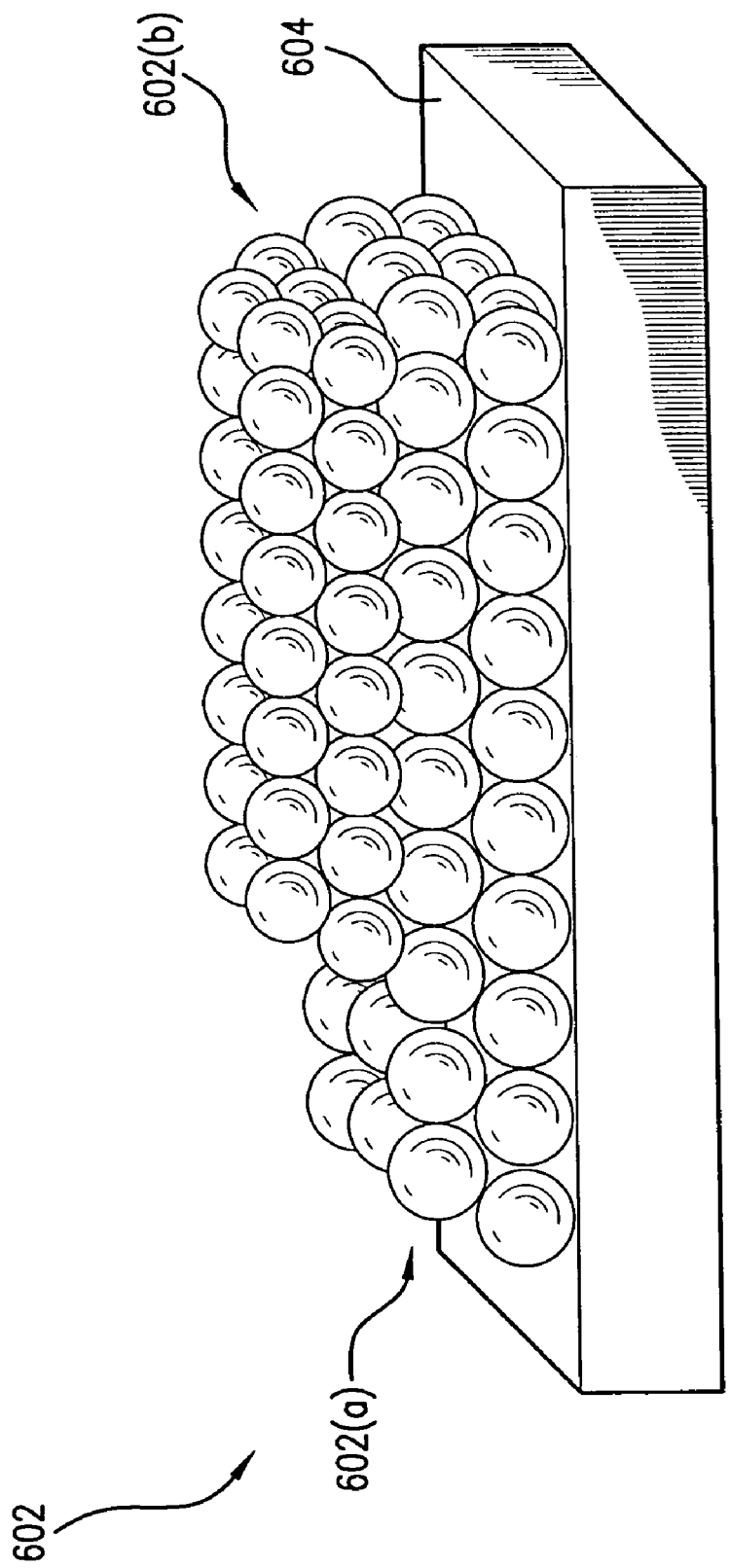
FIG. 5A is a perspective view of a colloidal crystal structure.

FIG. 5A shows a colloidal crystal structure 602 that may be printed by the printer 502 on a target area 604 using the two pens 506, 508 in this example. As shown, the colloidal crystal structure 602 includes a first section 602($a$) and a second section 602($b$). The first section 602($a$) is printed using the first pen 506 and is therefore formed from the larger "D1" diameter spheres of the first pen solution 512. The second section 602($b$) of the colloidal crystal structure 602 is printed using the second pen 508 and is therefore formed from the smaller "D2" diameter spheres of the second pen solution 516. It is noted that the first section 602($a$) and the second section 602($b$) can have two different photonic bandgaps. Accordingly, the colloidal crystal 602 may be used in a waveguide structure to guide waves of a frequencies that fall within the two bandgaps.

Figure 5B:
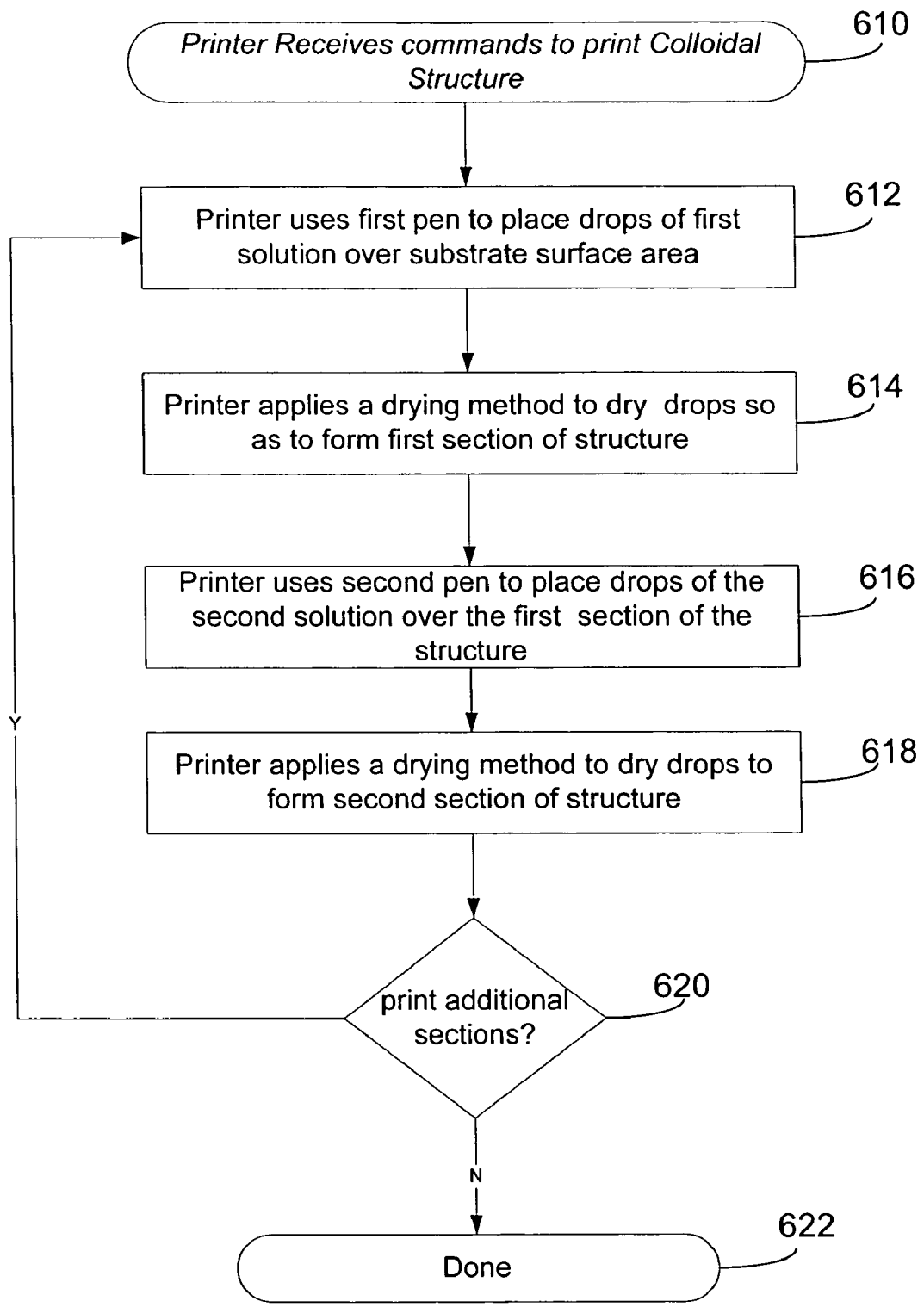
FIG. 5B is a flow diagram illustrating one example of how a printer may operate to print a colloidal crystal structure.

FIG. 5B is a flow diagram illustrating one example of how the printer 502 may operate to print the colloidal crystal structure 602. As shown in FIG. 5B, we assume that the printer 502 receives electronic commands to print the colloidal crystal structure 602 at a particular area (target area 604) on the substrate surface 510 (step 610). In response to these commands, the printer 502 proceeds to print the colloidal crystal structure 602 as is described below.

At step 612, the printer 502 uses the first pen 506 to place drops of the solution 512 over the target area 604. At step 614, the printer 502 applies a pre-determined drying method (e.g., the first drying method 522) to the drops placed on the target area 604 at step 612. As the drops dry the "D1" diameter spheres in the drops self-assemble to form, over the target area 604, the first section 602($a$) of the colloidal crystal structure 602.

At step 616, the printer 502 uses the second pen 508 to place drops of the second pen colloidal crystal solution 516 over the first section 602($a$). At step 618, the printer 502 applies a pre-determined drying method (e.g., the second drying method 526) to the drops placed at step 616. As the drops dry, the "D2" diameter spheres in the drops self-assemble to form (over the first colloidal crystal section 602($a$)) the second section 602($b$) of the colloidal crystal structure 602.

In some implementations, the printer may proceed to build additional sections (not shown in FIG. 5A) in the colloidal crystal structure 602 in a similar manner (step 620). At step 622, the printing process ends.

It is worthwhile to note that in some embodiments, a substrate that will be used for print a colloidal crystal structure may be modified (prior to the printing process) to prevent or limit undesired solution mobility on the surface of the substrate. Such modification may be in the form of surface chemical treatments, for example.

By way of one specific example, prior to the printer 100 (or printer 502) printing a colloidal crystal structure on a substrate surface, the surface may be selectively treated with a suitable hydrophobic and/or a hydrophilic substance. According to one embodiment, for example, the substrate surface is treated with a hydrophilic substance in areas that correspond to the target area wherein a colloidal crystal structure is to be printed. Areas surrounding the target area may be treated with a hydrophobic substance, for example. During the printing of the colloidal crystal structure, such an arrangement may prevent or limit undesired drop solution mobility off the target area into areas surrounding the target areas.

Figure 6A:
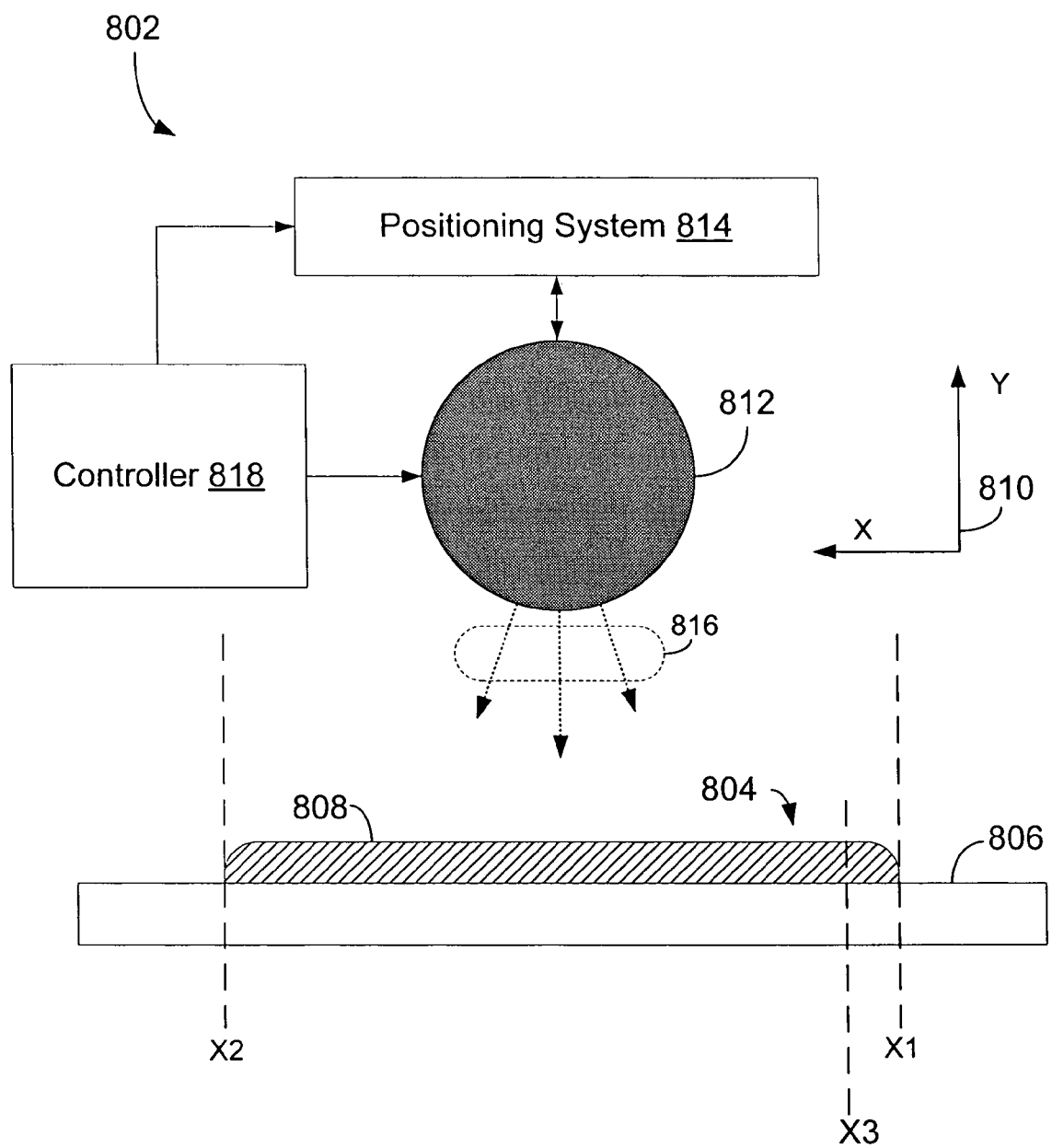
FIG. 6A is a block diagram of a drop drying system.

FIG. 6A is a block diagram of a drop drying system 802 that is accordance with one embodiment of the invention. The drop drying system 802 may be incorporated within a colloidal crystal structure printer and can be used by such a printer, for example, to dry a quantity of solution drops 804 placed on a substrate surface 806 via a printhead and/or a pen.

Shown in FIG. 6A is a cross-sectional view of the solution 804 and the air/solution boundary 808 just prior to a drying procedure (described below) being performed. We assume in this example an XY coordinate system 810 and that the air/solution boundary 808, in an XY plane, spans from an "X1" coordinate to an "X2" coordinate as shown.

In this embodiment, the drop drying system 802 includes a heating element 812 that can be moved (by a positioning system 814) relative to the solution 804. As indicated in FIG. 6A, the heating element 812 can emit electromagnetic radiation 816 that can be absorbed by the solution 804 and thereby raise solution temperature. The electromagnetic radiation 816 emitted by the heating element 812 may be infrared or microwave radiation, for example.

In this embodiment, both the heating element 812 and the positioning system 814 operate under the control of a controller 818. The controller 818 may be the main controller of the printer that incorporates the drop drying system 802, for example. In some cases, the positioning system 814 may have a dual use in that it is also used to move the printhead/pen that was originally used by the printer to place the solution 804 on the substrate surface 806.

FIG. 6B is an exploded cross-sectional view of the solution 804 between coordinates X1 and X3 during a drying operation. As indicated in FIG. 6B, during a drying operation, the heating element 812 produces electromagnetic radiation 816 and is also moved at a controlled rate over the air/solution boundary 808 along a path 820 that may originate at or near the X1 coordinate.

As the heating element 812 travels along the path 820, the electromagnetic radiation 816 emitted by the heating element 812 causes the solution temperature to rise thereby increasing solution evaporation rate. Typically solution temperature (and therefore evaporation rate) is higher at locations that are proximate to the heating element 812. This may result in colloidal crystal growth along the direction shown (crystal growth direction 823) which is parallel to the heating element 812 travel direction.

Example Waveguide

Figure 7:
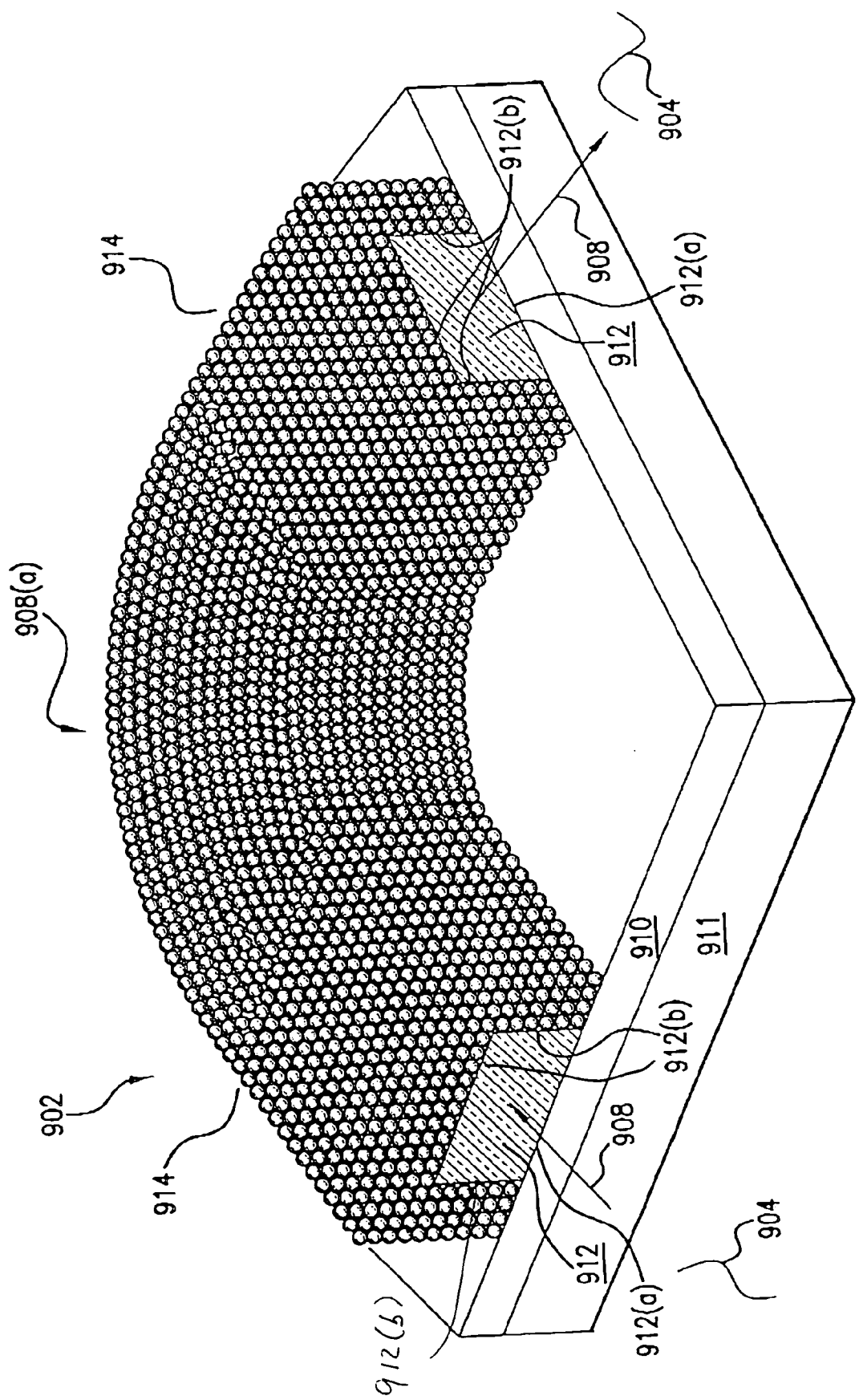
FIG. 7 is a cross-sectional view of an embodiment of a waveguide.

FIG. 7 sets forth a perspective cross-sectional view of one example of a waveguide 902 that incorporates a printed colloidal crystal structure. During operation, the waveguide is used to guide waves 904 of certain frequencies (operational frequencies) to propagate along a pre-defined propagation path 908. As shown, the propagation path 908 may include one or more bended areas 908(*a*).

The waveguide 902 may include a cladding layer 910, a core region 912 and a printed colloidal crystal structure 914, for example. The core region 912 is disposed on the cladding layer 910 which in turn is disposed on a substrate surface 911. The colloidal crystal structure 914 is printed over the core region 912 and thereby covers the core region 912 as shown.

The core region 912 extends along the propagation path 908, has a pre-determined cross-section and is formed from a material that is transparent (or semi-transparent) to the waveguide operational frequencies. In this example, the waveguide core region 910 is solid and has a rectangular cross-section. A core region according to other embodiments, however, may have a non-rectangular cross-section and may not be solid. In some embodiments, the core region cross-section may vary along the propagation path.

In this example, the cladding layer 910 and the printed colloidal crystal structure 914 together provide the waveguide with a cladding region that is effective to constrain the waves 904 to follow the waveguide propagation path 908. The core region 912 and cladding layer 910 have a suitable refractive index contrast so as to provide a total internal reflection (TIR) boundary at the core-cladding layer interface. As a result, the core-cladding layer interface can internally reflect (via a refraction mechanism) the waves 904 propagating through the core region 912. The waves 904, by TIR, are thereby substantially constrained from exiting through the core-cladding layer interface.

In this example embodiment, the printed colloidal crystal structure 914 is shown in the figure as comprising of spheres of generally uniform size. In other embodiments, however, the printed colloidal crystal may comprise of particles of any suitable shape and size. The size and material of the spheres can be selected to provide a suitable bandgap that includes the operational frequencies of the waveguide.

The colloidal crystal structure 914 is printed over the core region 912 so as to substantially cover that portion of the core region 912 that is not in contact with the cladding layer 910. As a result of its bandgap property, the colloidal crystal structure 914 can constrain (via a diffraction mechanism), the waves 904 to follow the propagation path 908. The waves 904 are thereby constrained from propagating through the core region sides into the bulk of the colloidal crystal structure 914.

According to one specific implementation, for example, the waveguide operational frequencies correspond to wavelengths of 1200-1550 nm. The cladding layer 912(*a*) may be formed from Silicon Dioxide ($SiO_2$) and the core region 906 may formed from Silicon, Silicon Nitride or Silicon Oxinitride, for example. The spheres of the printed colloidal crystal may be formed from Silicon Dioxide, for example. The spheres may have a diameter selected from a range of 600-800 nm, for example, so as to provide for a bandgap that includes the waveguide operational frequencies.

Figure 8:
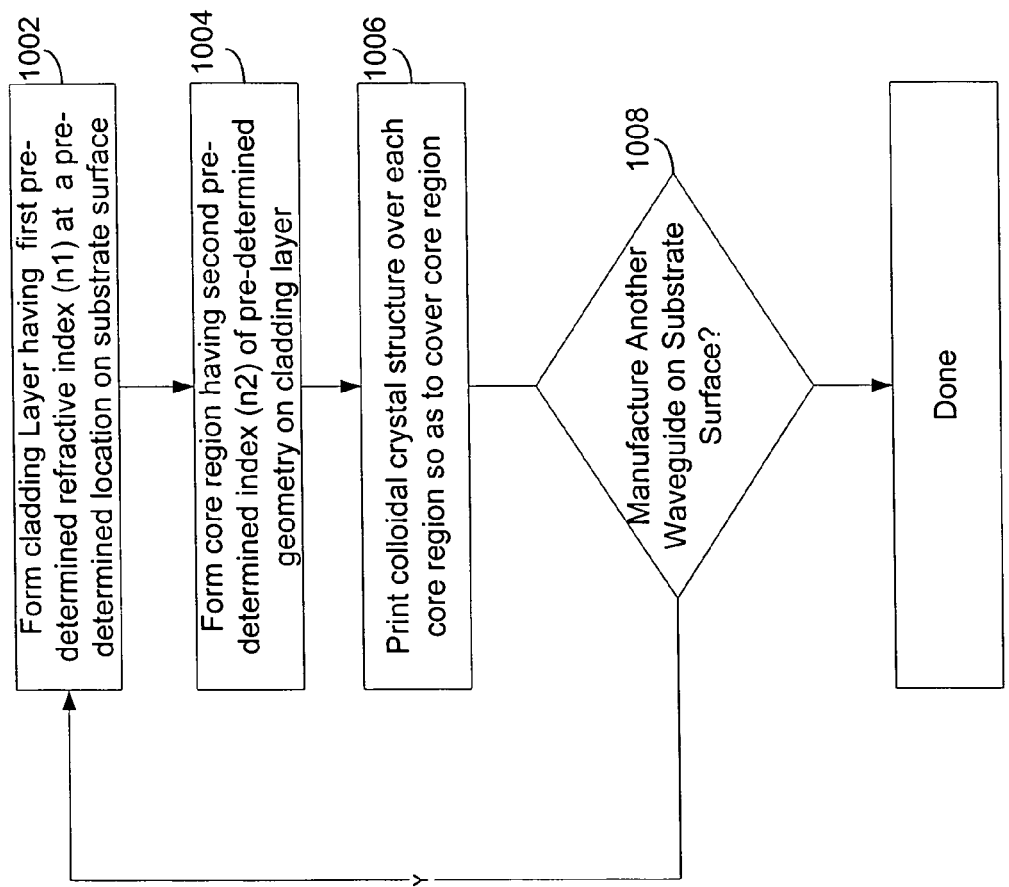
FIG. 8 is a flow diagram illustrating aspects of how a waveguide may be manufactured according to an embodiment.

FIG. 8 is a flow diagram illustrating aspects of how one or more waveguides, such as the waveguide 902 just described, may be manufactured according to an embodiment of the invention. At step 1002, the cladding layer is formed on a surface of a substrate.

At step 1004, a core region of the desired waveguide is formed on the cladding layer. The core region and cladding layer are formed from materials having a suitable refractive index so as to provide a total internal reflection (TIR) boundary at the core-cladding layer interface At step 1006, a desired colloidal crystal structure (e.g. crystal structure 406 or crystal structure 602) is printed over the core region. This step may be performed using any of the printers and printing methods described above. The printed colloidal crystal structure may be configured to have one or more desired photonic band gap properties that include the operational frequencies of the waveguide.

The steps just described may generally be repeated so as to manufacture additional waveguides on, for example, the same substrate surface (step 1008). If desired, the respective core region and printed colloidal crystal of each waveguide may be differently configured.

For example, a first waveguide (waveguide "A") and a second waveguide (waveguide "B") might be manufactured to guide, respectively, a first and second range of frequencies. Under this scenario, waveguide "A" may include a printed colloidal crystal structure having a bandgap property that includes the operational frequencies of waveguide "A". Waveguide "B" may include a printed colloidal crystal structure having a bandgap property that includes the operational frequencies of waveguide "B". Embodiments of the printer depicted in FIG. 5, for example, might be used to print the different colloidal crystal structures.

It is further noted that waveguides according to various embodiments of the invention may be useful to transfer signals and/or power in a microelectronic system. For example, a waveguide according to an embodiment may be used (as opposed to metal wires) to transfer communication signals between two components on a printed circuit board or between components within a single integrated circuit.

Figure 9:
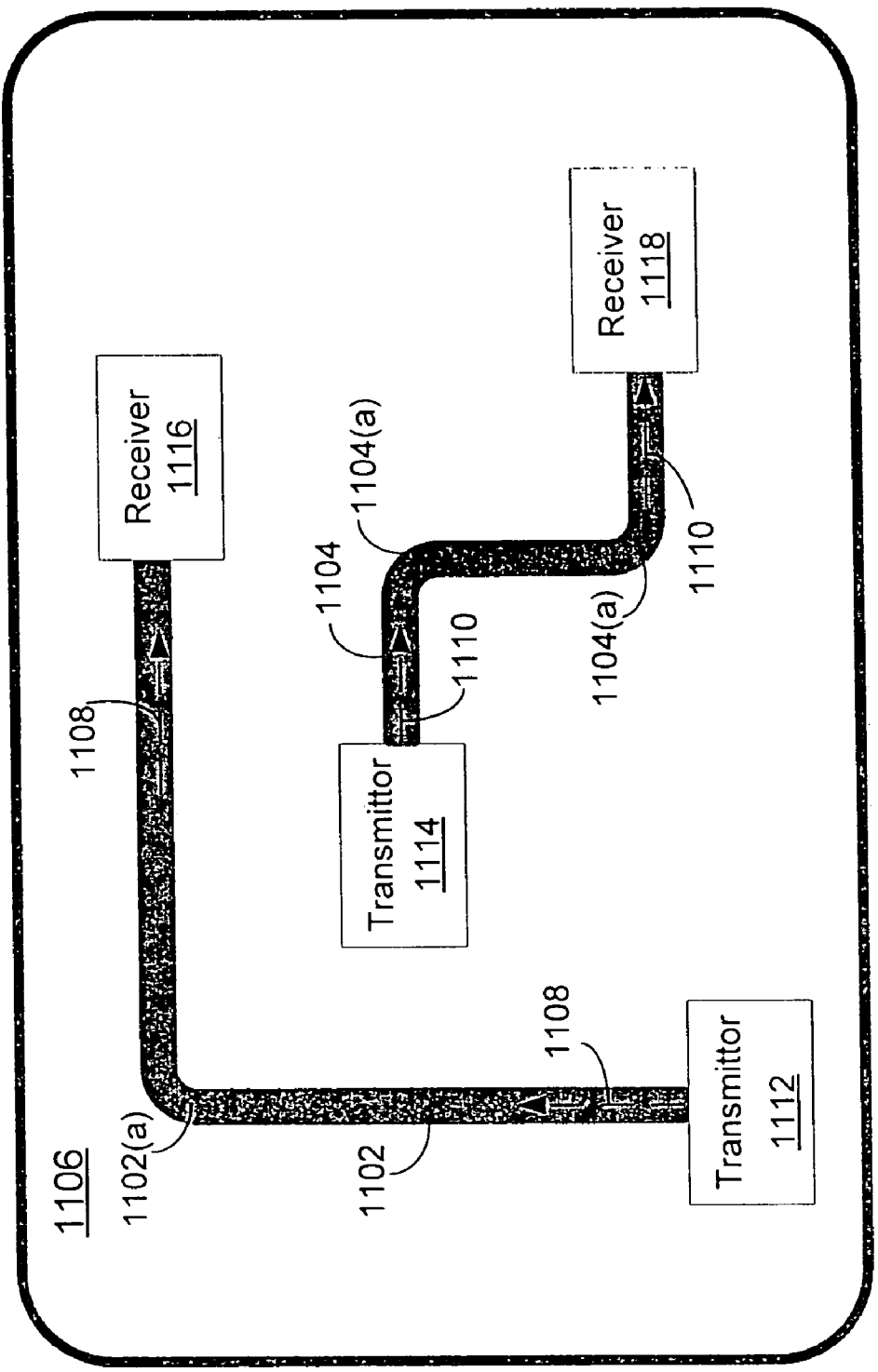
FIG. 9 is a plan view of one embodiment of a first and a second waveguide disposed on a surface.

FIG. 9, for example, shows a plan view of a first and a second waveguide 1102/1104 each disposed on a surface 1106 according an embodiment. The surface 1106 may represent a surface of a printed circuit board or an internal surface of an integrated circuit, for example. Each of the waveguides includes a respective core region that is covered by a respective printed colloidal crystal structure. Depending on the application and in accordance with the printing methods described above, the respective printed colloidal structures may be differently configured and have different bandgaps.

As illustrated in FIG. 9, each waveguide 1102/1104 may be used to transfer optical and/or infrared signals 1108/1110 from a respective transmitter 1112/114 to a respective receiver 1116/118. The waveguide 1102/1104 transfers the signals along different propagation paths. Each of these propagation paths may include one or more bended areas 1102(a)/1104(a).

Figure 10A:
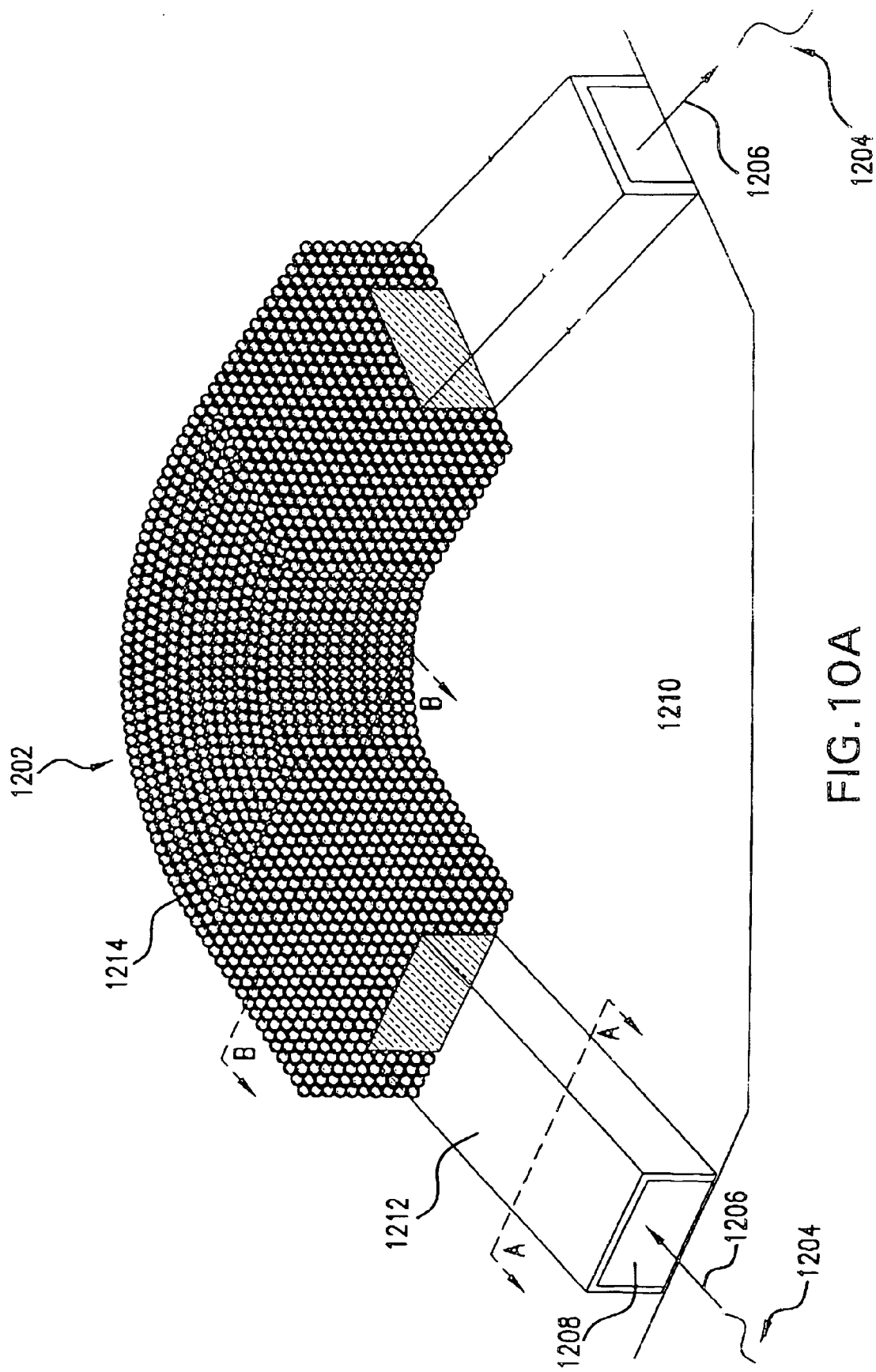
FIG. 10A sets forth a perspective cross-sectional view of another embodiment of a waveguide.
Figure 10B:
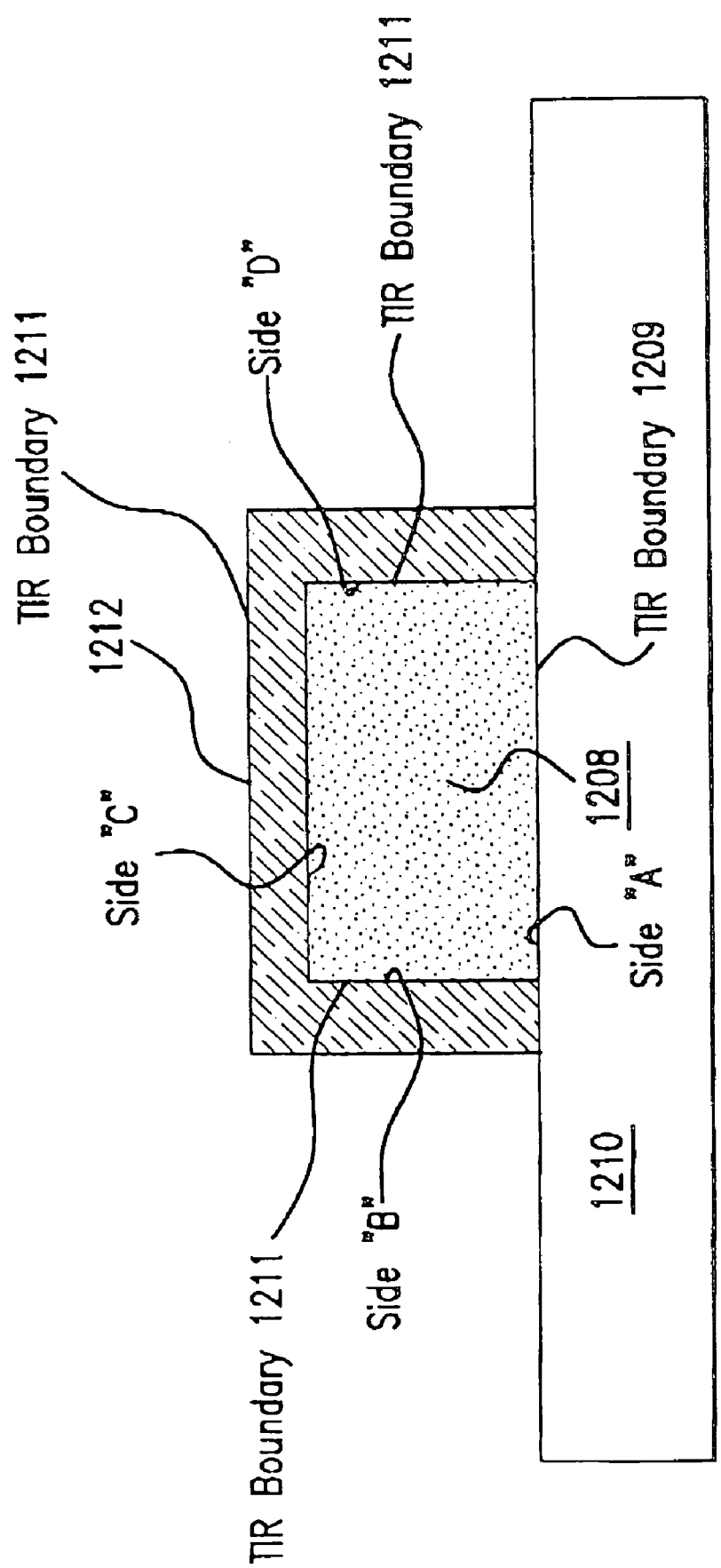
FIG. 10B sets forth a cross-sectional view of the waveguide 1202 along line "A"-"A" of FIG. 10A.
Figure 10C:
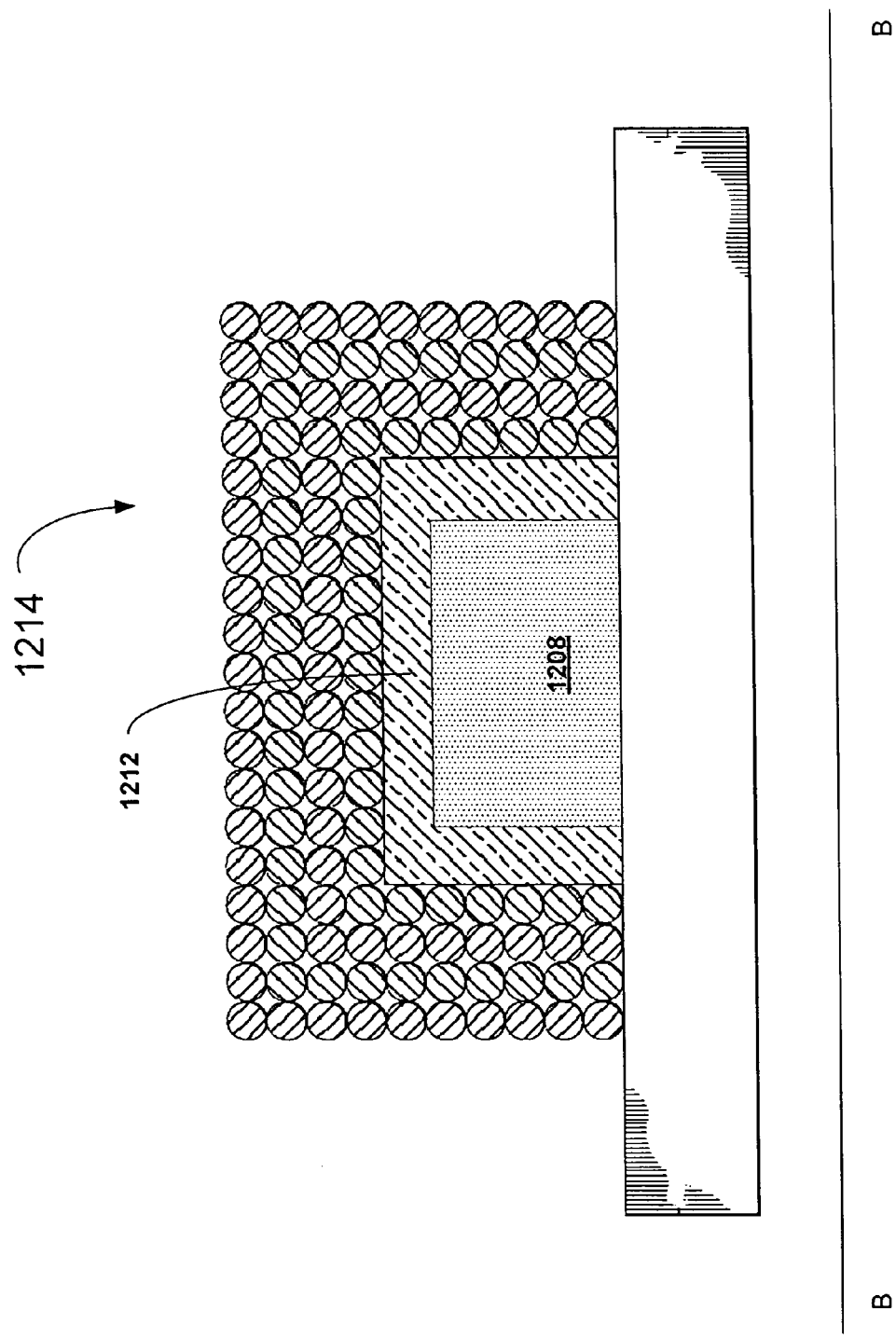
FIG. 10C sets forth a cross-sectional view of the waveguide 1202 along line "B"-"B" of FIG. 10A.

FIG. 10A sets forth a perspective cross-sectional view of another embodiment of a waveguide 1202. During operation, the waveguide 1202 is used to guide waves 1204 of certain frequencies (operational frequencies) to propagate along a (non-linear) propagation path 1206. FIG. 10B sets forth a cross-sectional view of the waveguide 1202 along line "A"-"A" of FIG. 10A. FIG. 10C sets forth a cross-sectional view of the waveguide 1202 along line "B"-"B" of FIG 10A.

Referring now to FIG. 10A-C, the waveguide 1202 includes a core region 1208, a lower cladding layer 1210 and an upper cladding layer 1212. The core region 1208 extends along the propagation path 1206. Accordingly, the core region 1208 includes both linear and bended sections (as indicated by FIG. 10A).

The core region 1208 is disposed on the lower cladding layer 1210. Accordingly, one side (side "A") of the core region 1208 is in contact with the lower cladding layer 1210. In this example, the refractive index of the lower cladding layer 1210 and of the core region 1208 are each selected so that a total internal reflection (TIR) boundary (first TIR Boundary 1209) is provided at the interface between the lower cladding layer 1210 and the core region 1208. The first TIR boundary 1209 can prevent (via a refraction mechanism) the waves 1204 from exiting the lower side (side "A") of the core region 1208.

The upper cladding layer 1212 covers (and is in contact with) those sides (sides B-D) of the core region 1208 that are not contact with the lower cladding layer 1210. In this example, the refractive index of the upper cladding layer 1212 and the core region 1208 are also selected so that a total internal reflection (TIR) boundary (second TIR boundary 1211) is provided at the interface between the upper cladding layer 1212 and the core region 1208. The second TIR boundary 1211 can prevent the waves 1204 from exiting the three sides B-D of the core region 1208.

The waveguide 1202 further includes a colloidal crystal 1214 that is printed so as to partially cover the upper cladding layer 1212. The colloidal crystal 1214 is configured to have a photonic bandgap property that includes the operational frequencies of the waveguide. In this example, the colloidal crystal 1214 is printed along the bended section of the core region 1208. This can reduce leakage of the waves 1204 through the sides B-D of this particular section of the core region 1208.

Although several specific embodiments of the invention have been described and illustrated, the invention is not to be limited to specific forms or arrangements of parts so described and illustrated. The invention is limited only by the claims and the equivalents thereof.

What is claimed is:

1. A method of manufacturing an electromagnetic (EM) waveguide capable of guiding waves through a core region that extends along a defined propagation path, the method comprising:

ejecting, by a printhead, drops of a first solution over at least a portion of the waveguide core region, where the first solution drops include first particles mixed in a solvent; and permitting the first particles in the first solution drops to self-assemble into a first colloidal crystal that at least partially covers the waveguide core region by removing the solvent from the ejected drops.

2. The method of claim 1, wherein the first, colloidal crystal has a photonic bandgap in a first range of frequencies; and wherein in operation the waveguide is used to guide waves of at least one frequency that is within the first range of frequencies.

3. The method of claim 2, further comprising:

forming a cladding layer;

forming the core region on the cladding layer;

wherein the refractive index of the cladding layer and the refractive index of the core region are selected so that a total internal reflection (TIR) boundary is provided at the core-cladding layer interface.

4. The method of claim 2, further comprising:

forming a cladding layer on the core region, where the cladding layer and the core region are configured to provide a total internal reflection (TIR) boundary at the core-cladding layer interface;

where the ejecting and permitting steps are performed so that the first colloidal crystal covers both the cladding layer and the core region.

5. The method of claim 2, wherein the first particles are oval shaped and are of generally uniform size.

6. The method of claim 2, wherein the first particles are spheres of generally uniform diameter.

7. The method of claim 2, wherein the first particles are spheres of various diameters.

8. The method of claim 2, wherein the first solution is a monodisperse solution of hydrophilic particles in a solvent.

9. The method of claim 2, wherein the first solution is a monodisperse solution of hydrophobic particles in a solvent, where the solvent comprises at least one of an aromatic hydrocarbon, an aliphatic hydrocarbon or a halogenated hydrocarbon.

10. A method of manufacturing an electromagnetic (EM) waveguide capable of guiding waves through a core region that extends along a defined propagation path, the method comprising:

ejecting, by a printhead, drops of a first solution over at least a portion of the waveguide core region, where the first solution drops include first particles;

permitting the first particles in the first solution drops to self-assemble into a first colloidal crystal that at, least partially covers the waveguide core region;

ejecting, by a printhead, drops of a second solution over the first colloidal crystal, where the second solution drops include second particles;

permitting the second particles in the second solution drops to self-assemble into a second colloidal crystal that at least partially covers the first colloidal crystal;

wherein the first colloidal crystal has a first photonic bandgap;

wherein the second colloidal crystal has a second photonic bandgap that is different than the first photonic bandgap;

wherein in operation the waveguide is used to guide waves of a first frequency that is within the first, bandgap and of a second frequency that is within the second bandgap.

11. A method of manufacturing a waveguide for guiding waves along a propagation path, comprising:

forming a first cladding layer on a surface of a substrate;

forming a core region of the waveguide on the first cladding layer, the core region extending along the propagation path;

forming a second cladding layer over the core region;

printing, by operation of an inkjet printer, a colloidal crystal on the second cladding layer so that the colloidal crystal at least partially covers the second cladding layer.

12. The method of claim 11, wherein an interface between the first cladding layer and the core region provide a first total internal reflection (TIR) boundary;

wherein an interface between the second cladding layer and the core region interface provide a second TIR boundary.

13. The method of claim 11, wherein the printed colloidal crystal has a photonic bandgap.

14. The method of claim 11, wherein the printing step comprises:

increasing a dispersion level of particles in a solution;

ejecting, by a printhead, drops of the solution onto the second cladding layer;

permitting the particles in the solution drops to self-assemble into the colloidal crystal.

15. The method of claim 11, wherein the printing step comprises:

applying ultrasonic waves to a solution that comprises particles so as to disperse the particles in the solution;

ejecting, by a printhead, drops of the solution onto the second cladding layer;

wherein the particles in the ejected drops self-assemble into the colloidal crystal.

16. A method of manufacturing a waveguide, comprising:

forming a first core region of a first waveguide on a surface, wherein the first core region extends along a first propagation path;

forming a second core region of a second waveguide on the same surface, wherein the second core region extends along a second propagation path;

operating an inkjet printer to print a first colloidal crystal structure over the first core region;

operating an inkjet printer to print a second colloidal crystal over the second core region;

wherein the first and second colloidal crystal each have a photonic bandgap.

17. The method of claim 16, further comprising:

prior to printing the first colloidal crystal, forming a first cladding layer on the first core region;

prior to printing the second colloidal crystal, forming a second cladding layer on the second core region.

18. The method of claim 16, wherein the surface is one of a surface of a printed circuit board or a surface of an integrated circuit.

19. The method of claim 1, wherein the removing is performed by evaporating the solvent.

20. A method of manufacturing an electromagnetic (EM) waveguide capable of guiding waves through a core region that extends along a defined propagation path, the method comprising:

ejecting, by a printhead, drops of a first solution over at least a portion of the waveguide core region, where the first solution drops include first particles;

permitting the first particles in the first solution drops to self-assemble into a first colloidal crystal that at least partially covers the waveguide core region;

ejecting, by a printhead, drops of a second solution over the first colloidal crystal, where the second solution drops include second particles; and permitting the second particles in the second solution drops to self-assemble into a second colloidal crystal that at least partially covers the first colloidal crystal.

* * * * *

UNITED STATES PATENT AND TRADEMARK OFFICE
CERTIFICATE OF CORRECTION

PATENT NO. : 7,470,581 B2
APPLICATION NO. : 11/494429
DATED : December 30, 2008
INVENTOR(S) : Swaroop K. Kommera et al.

It is certified that error appears in the above-identified patent and that said Letters Patent is hereby corrected as shown below:

In column 10, line 42, in Claim 2, after "first" delete ",".

In column 11, line 16, in Claim 10, delete "at, least" and insert -- at least --, therefor.

In column 11, line 29, in Claim 10, after "first" delete ",".

Signed and Sealed this

Eighteenth Day of August, 2009

David J. Kappos
*Director of the United States Patent and Trademark Office*